United States Patent [19]
McGehee et al.

[11] 3,865,527
[45] Feb. 11, 1975

[54] TIRE CONDITIONING AND TRUING APPARATUS

[76] Inventors: C. Bernie McGehee, 2212 Robin Hood, Albany, Ga. 31705; J. Samuel Rees, Rt. 1, Box 4, Preston, Ga. 31824; Luther J. Johnson, Jr., P.O. Box 56, Preston, Ga. 31824

[22] Filed: Aug. 25, 1972

[21] Appl. No.: 283,808

[52] U.S. Cl............... 425/11, 157/13, 264/36, 425/40
[51] Int. Cl............... B29h 3/00, B29h 21/00
[58] Field of Search............ 425/28, 11, 34

[56] References Cited
UNITED STATES PATENTS
3,635,610  1/1972  Hall et al. ................. 425/34 X Primary Examiner—J. Howard Flint, Jr.
Attorney, Agent, or Firm—Jones, Thomas & Askew

[57] ABSTRACT

Apparatus for conditioning a tire for truing by removing flat spots, and for subsequently truing the tire. Tire conditioning is accomplished by applying heat directly to the tire sidewalls and by concurrently rotating the tire while laterally maintaining tire position with rollers. Tire truing apparatus includes a mandrel which may be adjustably supported by the tire conditioning apparatus, and a truing cutter mounted at an elevated location to reduce or eliminate clogging with removed rubber.

7 Claims, 7 Drawing Figures

PATENTED FEB 1 1 1975 3,865,527

TIRE CONDITIONING AND TRUING APPARATUS

The present invention relates to apparatus for operating on tires, and more particularly relates to an apparatus for use in conditioning and truing tires such as vehicle tires.

It has long been known to operators of automobiles and other motor vehicles that the service life of the vehicle tires can be substantially extended if certain preventive measures are taken. By way of example, one of such preventive measures is the balancing of the tires to insure that the load applied to the tire is substantially uniform at rotational speed.

Automotive tires have become increasingly expensive in recent years, particularly with the introduction and/or popularization of relatively expensive types of tires such as the belted tire and the radial tire. The cost of such tires further emphasizes the need for the motorist to take all measures necessary to enhance the service life of the tire.

One of the measures which is becoming increasingly popular is known as "tire truing." Although a tire is obviously nominally round, certain imperfections in mass-produced tires typically result in tires which are not exactly round. Furthermore, even an exactly-round tire may become distorted to an out-of-round condition when mounted on a non-round wheel. Tire truing is the name which describes the removal of rubber from the tire tread to the extent necessary to make the tire "exactly-round" with respect to the axis of rotation of the wheel on which the tire is mounted. Obviously, a tire which is to be both trued and balanced should first be trued since the balance of the tire will be affected by the removal of tread rubber in the truing operation.

It is known in the tire art generally, and with application to the tire truing art particularly, that a tire develops a flat spot when the vehicle on which the tire is mounted remains stationary for a short while. These so-called flat spots, which result from a temporary stress-induced "set" in the tire cords, are relaxed or removed by operating the tire for a while at highway speeds which apply both heat and flexure to the tire. It can be seen, however, that any attempt to true a tire in which a flat spot has not been completely removed will result in truing the tire to a reference determined by the flat spot. Not only will an excessive and unnecessary amount of tread rubber be removed in this way, but the former flat spot may become a "high spot" in the tire when the flat spot becomes relaxed.

Because of the foregoing problems relating to tire flat spots, it has been known in the art that a tire should be conditioned to remove the flat spots prior to being trued. Such tire conditioning can take the simple expedient of driving the vehicle at highway speeds for a sufficient time to remove the flat spots, but the numerous disadvantages of this expedient are so apparent as to need no elaboration. Tire conditioning apparatus is also known to the prior art, such apparatus typically including some device for rotating the tire while simultaneously heating the tire tread to simulate highway travel of the tire. Many disadvantages of such prior-art tire conditioning apparatus, such as an inability to rotate the tire without wobble or other unwanted motion and also such as an excessive amount of time required to adequately "condition" the tire, have prevented such tire conditioning apparatus from reaching widespread acceptance.

The tire truing apparatus of the prior art, exemplified by a tire supporting spindle for supporting the tire in a vertical plane and a rubber removing apparatus positioned proximately beneath the spindle to engage the periphery of the tire tread, has also proven less than satisfactory because the removed tread rubber tends to accumulate on or around the rubber removing apparatus to clog and foul its effective operation.

Accordingly, it is an object of the present invention to provide improved tire conditioning apparatus.

It is another object of the present invention to provide tire conditioning apparatus for rapid and effective removal of flat spots from tires.

It is still another object of the present invention to provide tire conditioning apparatus which effectively conditions tires while preventing wobble or other unwanted movement of a tire.

It is still another object of the present invention to provide tire conditioning apparatus in combination with tire truing apparatus of novel design and function.

It is yet another object of the present invention to provide improved tire truing apparatus.

These and other objects of the invention will become apparent from the description of preferred embodiments thereof in the following specification, together with the accompanying drawings, wherein like parts are referred to and indicated by like reference characters, and wherein.

Stated in general terms, the tire conditioning apparatus of the present invention applies heat directly to the sidewalls of the tire while such sidewalls are undergoing flexure. Suitable guides such as laterally-disposed rollers are positioned to engage the sidewalls while the tire is being rotated, so that the tire rotates in a true, non-wobbling manner and additionally so that the sidewalls are flexed to enhance the removal of tire flat spots. The tire truing apparatus of the present invention is arranged to eliminate or reduce unwanted buildup of removed tread rubber on the truing apparatus, and this truing apparatus is advantageously constructed in combination with the tire conditioning apparatus of the present invention.

Figure 1:
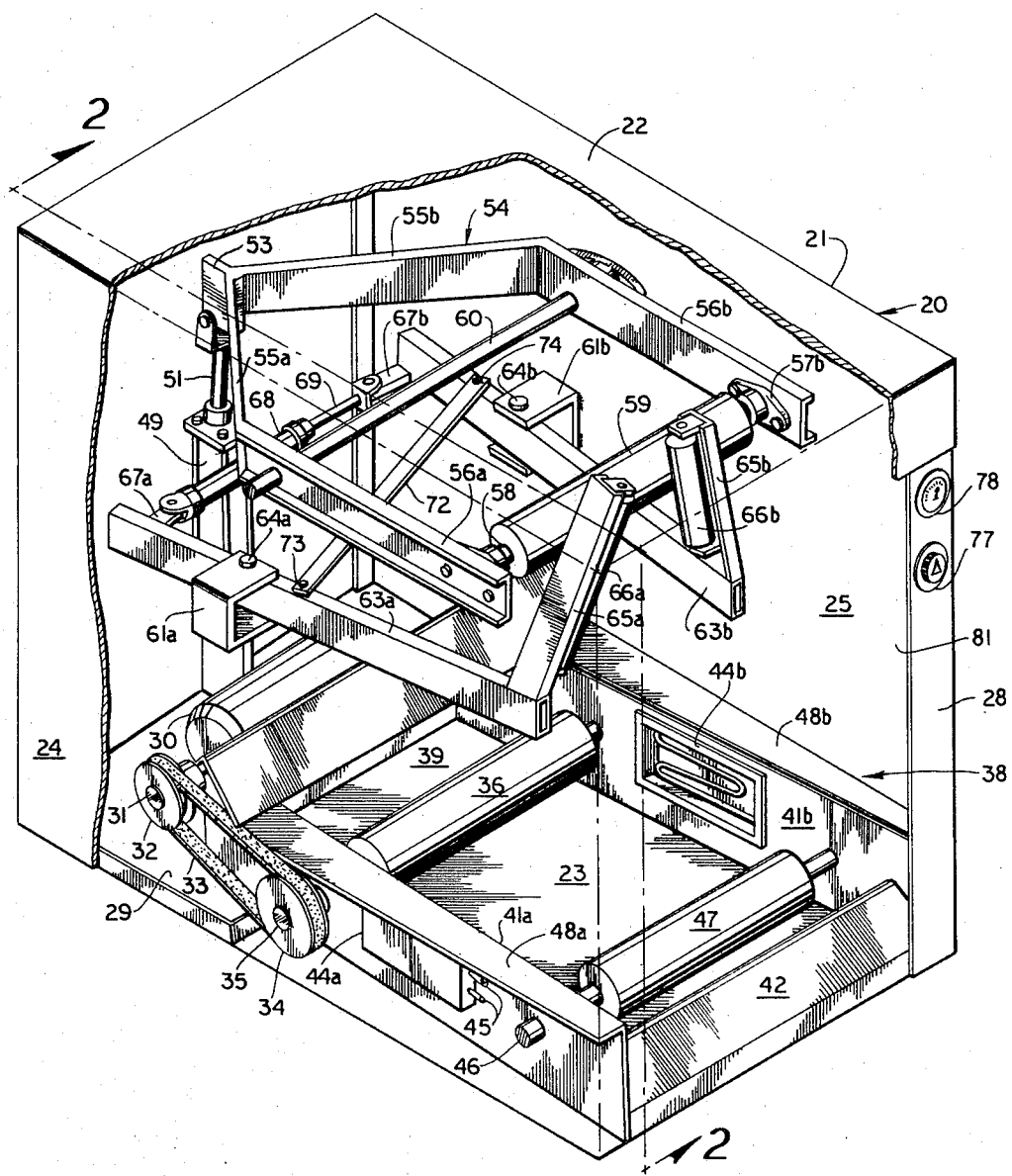
FIG. 1 is a perspective view of the tire unit of the present invention, with parts broken away and in section.
Figure 3:
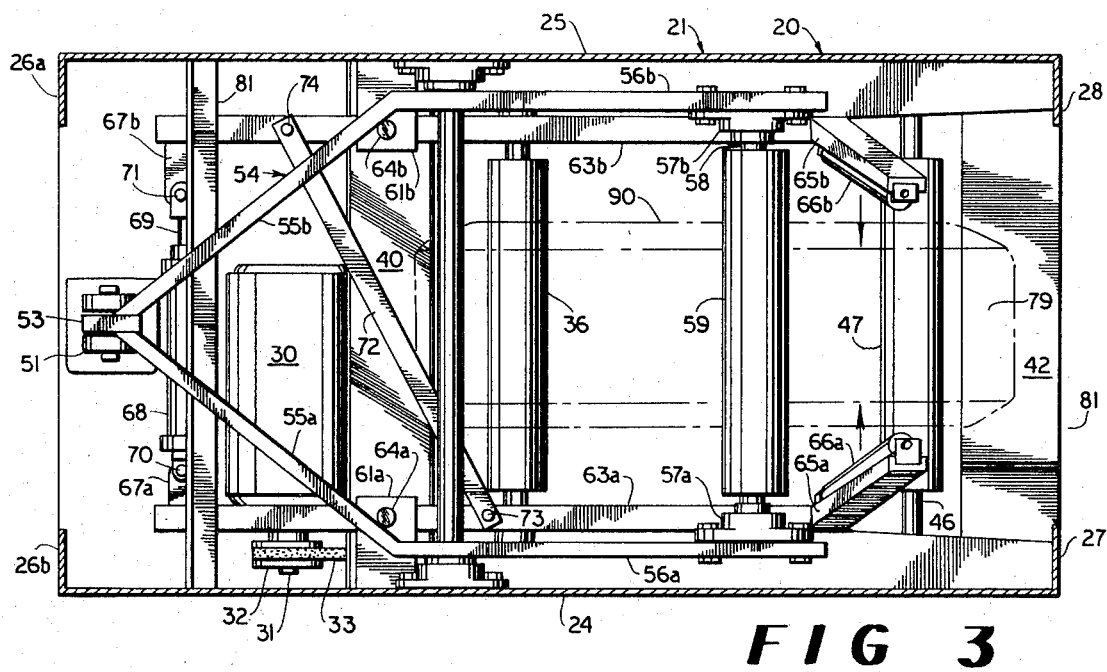
FIG. 3 is a sectional view taken on the line 3—3 of FIG. 2.

Stated more particularly and with reference to the disclosed embodiment of the present invention, as depicted in the drawings, the numeral 20 generally indicates a tire conditioning apparatus according to a disclosed embodiment of the present invention and including a hollow housing 21 having horizontally disposed top and bottom walls 22 and 23, as well as vertically disposed sidewalls 24 and 25, FIGS. 1 and 3. The housing 21 includes vertically disposed flange portions 26 at the rear of the housing and vertically disposed flange portions 27 and 28 at the front of the housing 21.

Figure 2:
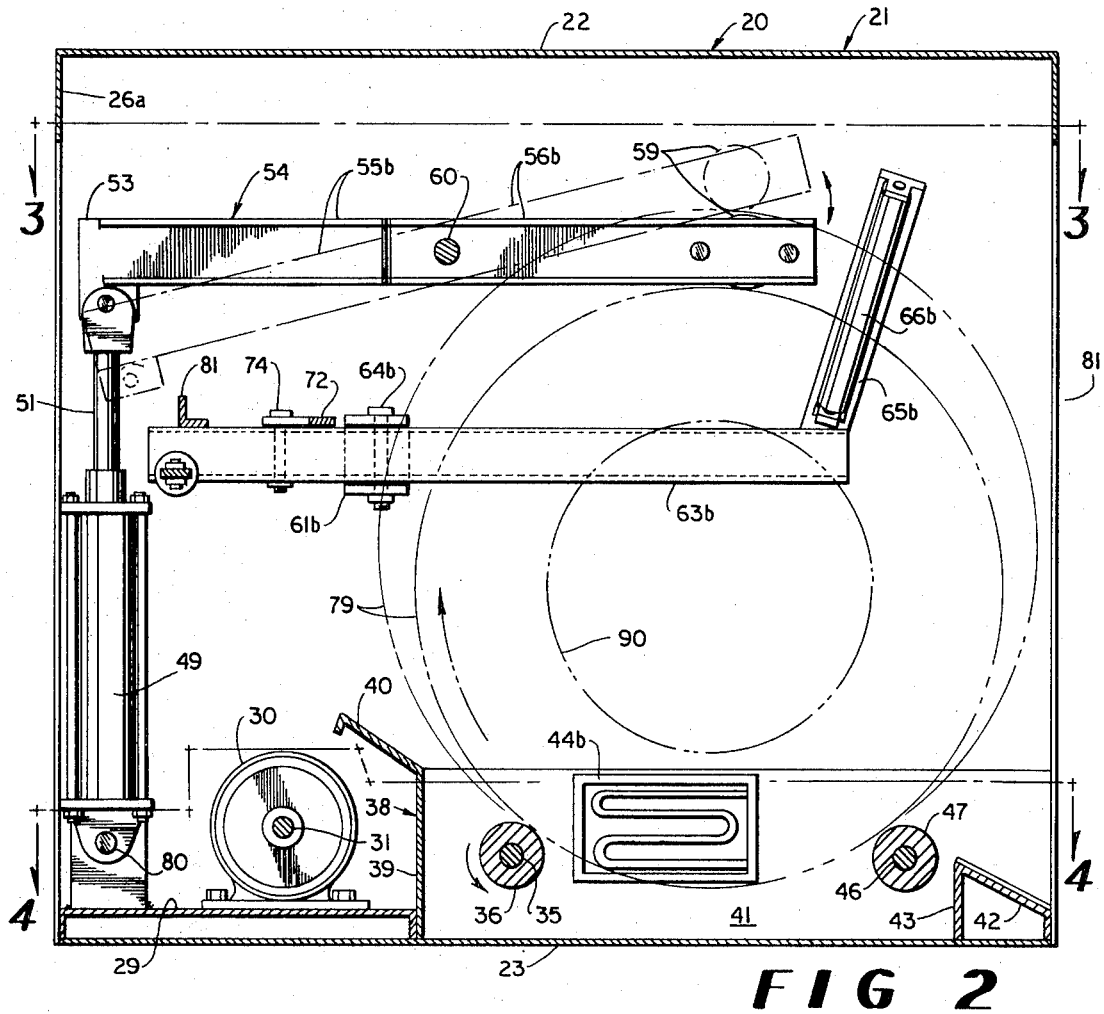
FIG. 2 is a sectional view taken on the line 2—2 of FIG. 1.
Figure 4:
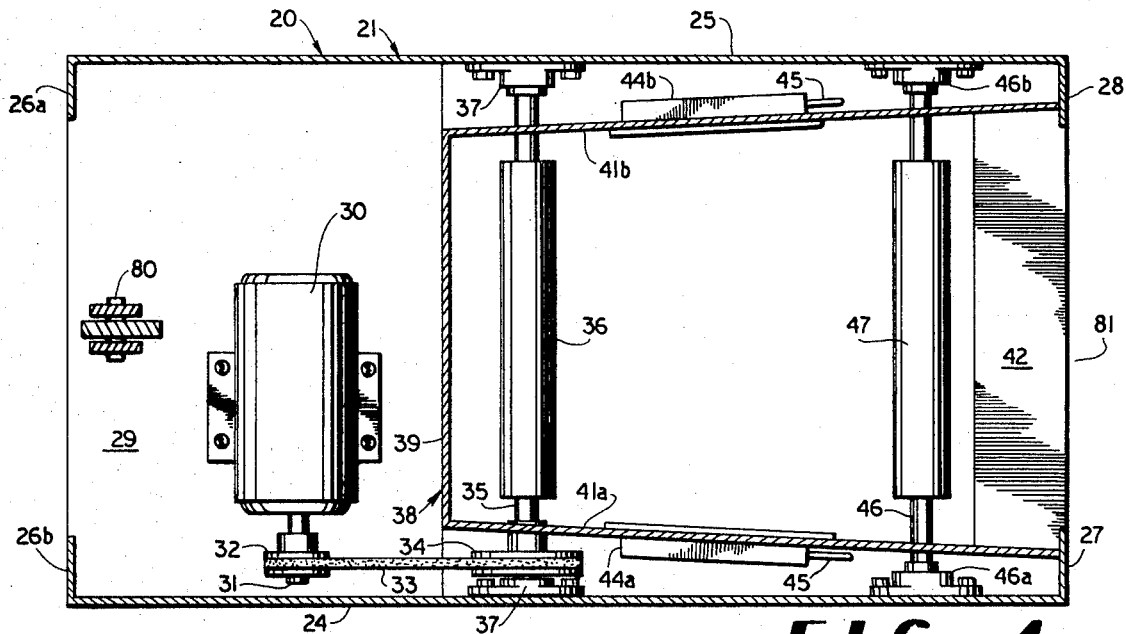
FIG. 4 is a sectional view taken on the line 4—4 of FIG. 2.

As shown in FIGS. 2 and 4, there is provided in the lower rear portion of the housing 21 a horizontally disposed platform 29 which has an electric motor 30 mounted thereon, and the motor 30 includes shaft 31 having a pulley 32 on an end thereof. An endless belt 33 engages the pulley 32, and the belt 33 also engages a pulley 34 on a horizontally disposed shaft 35. The shaft 35 has a roller 36 thereon. The ends of the shaft 35 are journalled in bearings 37 that may be arranged as shown in FIG. 4.

Mounted in the lower front portion of the housing 21 is a compartment 38, best shown in FIGS. 1 and 4, which is partially defined by a wall portion 39 upstanding from the bottom wall 23 and having an inclined wall section 40 adjacent its upper edge. A pair of sidewall sections 41a and 41b are arranged extending forwardly from said wall portion 39 at an acute angle with respect to each other, so that the front portions of the walls 41a and 41b are spaced further apart than the rear portions of such walls as best shown in FIG. 4. The open front ends of the wall portions 41a and 41b, along with the front flange portions 27 and 28, define a tire receiving opening 81 in the front of the apparatus 20. A ramp 42 supported in part by a brace member 43 is provided adjacent from lower portion of the opening 81.

A pair of heater elements 44a and 44b are mounted in diametrically opposed relation with respect to each other, in the sidewalls 41a and 41b, with the heater elements being connected through wires as at 45 to a suitably-switched source of electrical energy. A horizontally-disposed idler roll 47 is mounted on a shaft 46 which extends through the sidewalls 41a, 41b to be journalled in suitable bearings 46a, 46b. It can be particularly seen from FIGS. 1 and 4 that the rollers 36 and 47 are disposed in spaced-apart relation from each other, and that an object positioned in the space between such rollers may be subjected to heat applied by the heater elements 44a and 44b. The sidewalls 41a and 41b may be provided with horizontal top portions correspondingly designated at 48a and 48b.

As best shown in FIGS. 1 and 2, there is provided a vertically disposed actuator 49 such as a hydraulic or pneumatic cylinder or the like, having a rod 51 pivotally connected to an end piece 53 of the frame 54. The frame 54 includes a pair of rearwardly disposed first sections 55a and 55b which diverge outwardly to connect with or to continue as a pair of forwardly disposed spaced-apart parallel second sections 56a and 56b. A horizontal pressure roller 59 is mounted on a shaft 58 is journalled on the bearings 57a and 57b to be disposed adjacent the open ends of the second sections 56a and 56b. The frame 54 is mounted for pivotal movement around a shaft 60, so that the frame 54 and the associated pressure roller can be selectively moved by the actuator 49 to assume either of the positions shown in solid line and in broken line in FIG. 2.

Figure 5:
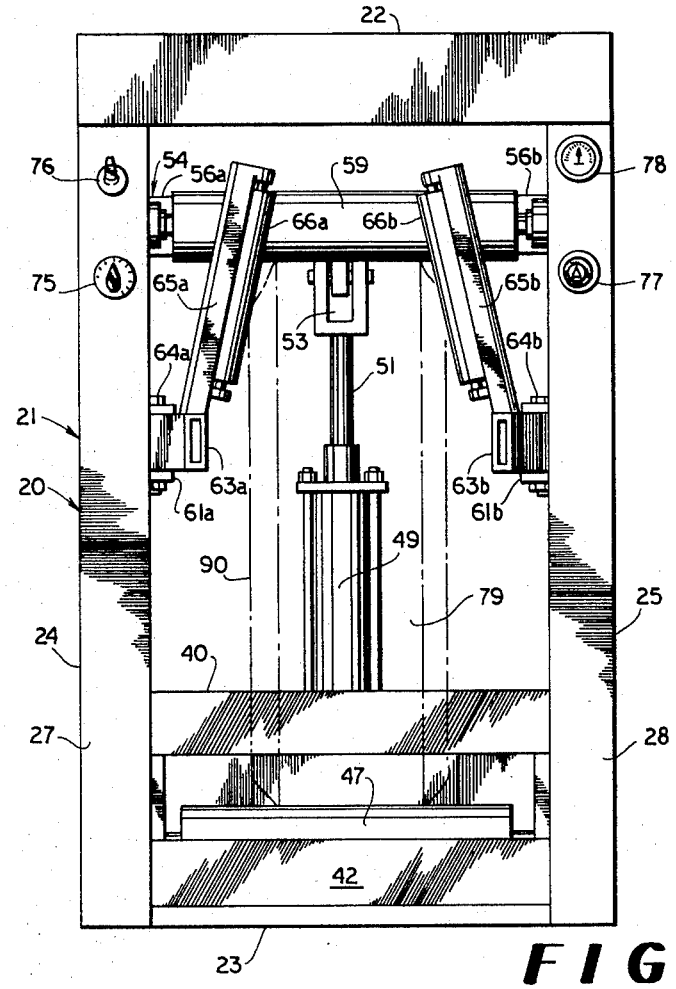
FIG. 5 is a front elevational view of the tire unit of the present invention.

A pair of U-shaped bracket members 61a, 61b are suitably affixed as by welding to the inner surface of the housing sidewalls 24 and 25. A pair of support arms 63a and 63b are pivotally connected as at 64a, 64b to the respective brackets 61a, 61b, and each of the support arms has an upwardly projecting bar 65a, 65b respectively affixed to or formed integrally with the front ends thereof. Each of the projecting bars 65a, 65b has a respective roller 66a, 66b journalled thereto, and these rollers 66a, 66b are disposed in spaced-apart confronting relation at an angle tending toward convergence at the upper portion of the opening 81, as best seen in FIGS. 3 and 5. A suitable actuator 68, such as a hydraulic or pneumatic cylinder, is pivotally interconnected between the lugs 67a and 67b fixed to the rearward end portions of the support arms 63a, 63b. An equalizer bar 72 is pivotally connected between a location 73, situated on the support arm 63a in front of the pivot 64a, and a location 74, situated on the support arm 63b behind the pivot 64b thereof. It will be understood that the equalizer bar 72 functions to position and define a scissors movement of the support arms 63a and 63b as motive force is applied from the actuator 68.

The various controls required for operating the present tire conditioning apparatus may advantageously be located on the front of the apparatus as depicted in FIG. 5. The heater elements 44a and 44b may advantageously be connected with a suitable time switch 75, for example, to enable a predetermined operating time to be preset. The operation of the motor 30 is controlled through a switch 76. If the actuators 49 and 68 are provided by pneumatically-powered cylinders as is appropriate in view of the ready availability of an air pressure source in any tire maintenance shop, these two actuators may be connected in parallel to receive pressurized air adjustably supplied through an appropriate pressure regulator 77. Alternatively, these actuators may be separately controlled. An air pressure gauge 78 may be provided to monitor the air pressure actually applied to the actuators.

Considering the operation of the tire conditioning apparatus as described above, the actuator 49 is operated to place the frame 54 in the position shown in broken-line in FIG. 2 and the actuator 68 is likewise operated to provide maximum spacing between the rollers 66a and 66b. The workpiece, consisting of an inflated tire 90 appropriately mounted on a conventional rimmed wheel, is then inserted through the opening 81 to be supported by the rollers 36 and 47. The air pressure regulator 77, or other appropriate control, is then operated to apply power to the actuator 49, whereupon the frame 54 is moved to substantially assume the position shown in solid line in FIG. 2, with the pressure roller 59 bearing upon the tread surface of the tire 90. The actuator 68 is also operated to move the facing pressure rollers 66a and 66b toward each other. As seen in FIG. 5, these pressure rollers 66a and 66b are mounted to exhibit an angle of convergence which approximates the cross-section sidewall configuration adjacent the tread of a typical inflated tire; the scissors action imparted to the arms 63a and 63b by the equalizer bar 72 causes the pressure rollers 66a and 66b to substantially center the tire 90 with respect to the pressure roller 59 and the lower rollers 36 and 47.

The motor 30 is now energized to rotate the roller 36 in a counter-clockwise direction for example, as viewed in FIG. 2. Since the tire 90 is forced by the pressure roller 59 into engagement with the drive roller 36 and the idler roller 47, it will be seen that the tire 90 is rotated in a clockwise direction in the given example. The heater elements 44a and 44b are energized for a predetermined time by operation of the time switch 75.

Since the heater elements are positioned in opposed, proximate relation to the sidewalls of the tire 90, heat from these heater elements is applied by radiation and otherwise directly to the tire sidewalls which are undergoing flexure by being forced against the drive roller 36 and the idler roller 47. This location of the heater elements to impart heat directly to the sidewalls of the tire, rather than being disposed to direct heat onto the tread surface of the tire, has been found to provide a more rapid and thorough conditioning of the tire to relax or otherwise remove any flat spots which may be present therein. The rollers 66a and 66b, in addition to maintaining the tire 90 substantially centered in the apparatus, also impart flexure force directly to the tire sidewalls to further enhance the conditioning process. Moreover, the contact maintained between the tire and all of the rollers 36, 47, 59, 66a and 66b causes additional heating of the tire resulting from direct frictional contact between the tire and the rollers and from the internal friction generated by such flexure.

The time switch 75 may be provided with a bell or other signal device which indicates the termination of a preset time period, so that an operator of the present tire conditioning apparatus may direct his attention to truing an already-conditioned tire, or to some other activity, while the tire 90 is undergoing conditioning. At the end of the desired conditioning time period, the motor switch 76 is turned off and the pressure regulator 77 or other control is operated to cause the pressure roller 59, as well as the rollers 66a and 66b, to be withdrawn from the tire 90. The tire is then ready to be withdrawn from the apparatus through the opening 81, and can next be mounted on a suitable truing apparatus.

Figures 6, 7:
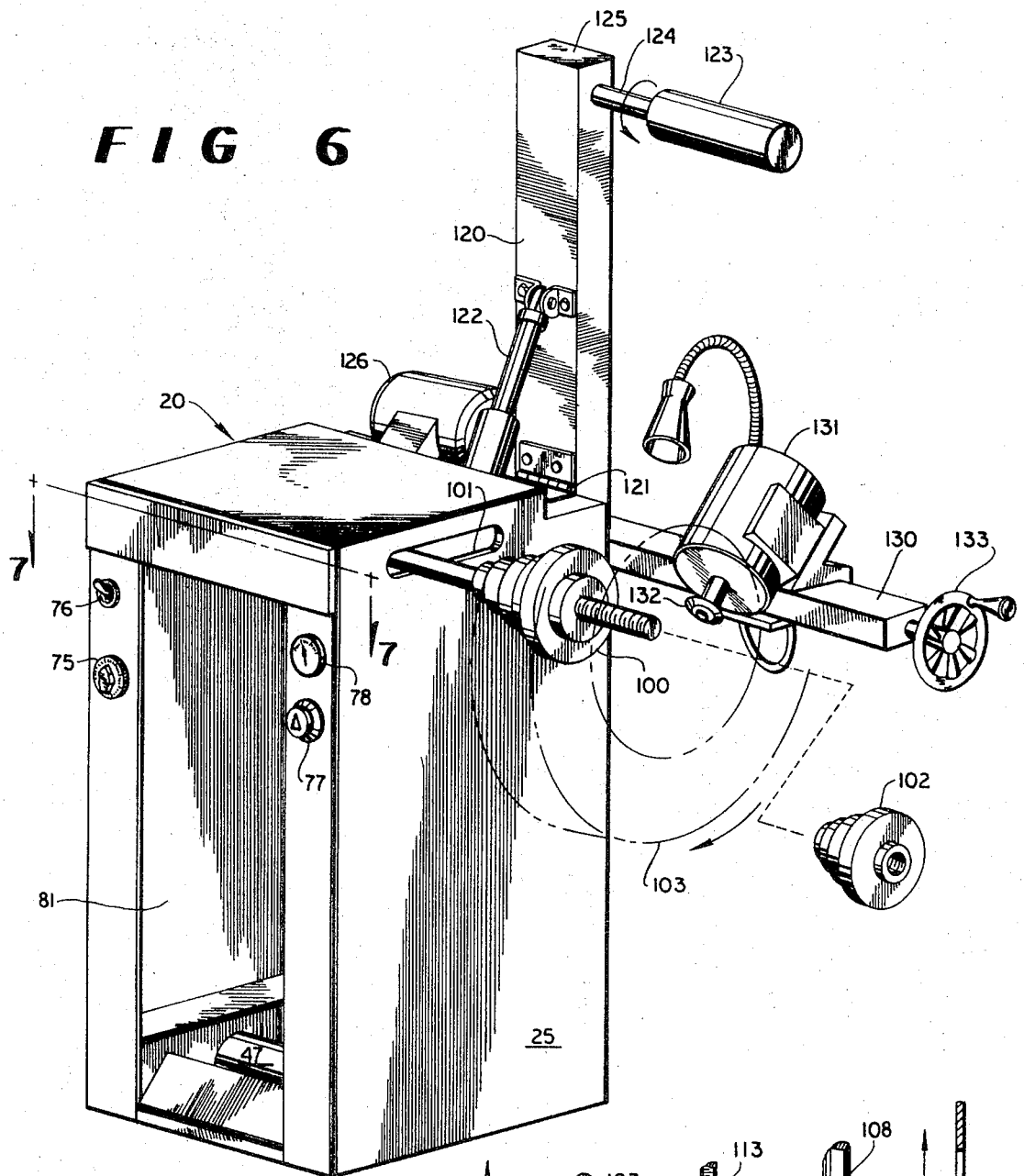
FIG. 6 is an isometric view of another embodiment of the present invention, showing tire truing apparatus in combination with tire conditioning apparatus.
FIG. 7 is a sectional view taken along line 7—7 of FIG. 6.

According to the embodiment of the present invention as depicted in FIGS. 6 and 7, tire conditioning apparatus of the type exemplified in FIGS. 1-5 is combined with novel tire truing apparatus as disclosed herein. The tire truing apparatus of the present invention, both taken by itself and as used in combination with the present tire conditioning apparatus, provides many operational advantages.

As shown in FIG. 6, the tire conditioning apparatus indicated generally at 20 is provided with a wheel mounting mandrel 100 which extends through an elongated slot 101 formed in the sidewall 25 of the tire conditioning apparatus. The mandrel 100 is provided with conventional apparatus such as the cone sets 102 to facilitate rapid attachment and detachment of a wheel-mounted tire as shown in broken line at 103.

The mandrel 100 extends through the slot 101 and into the hollow housing 21 of the tire conditioning apparatus to be journalled for rotation in bearings 104 and 105. The bearings 104 and 105 are mounted upon a plate 106 having a dimension in length extending across a substantial portion of the width of the conditioning apparatus. A pair of parallel slide bars 107 and 108 are rigidly mounted to extend in a front-rear direction within the tire conditioning apparatus, and the plate 106 is mounted by sliding movement along the slide bars by means of the slide guides 109, 110, 111, and 112. The front-rear position of the plate 106, and thus the corresponding position of the mandrel 100, is determined by a threaded rod 113 rotatably mounted within the tire conditioning apparatus in substantially parallel relation with the slide bars 107 and 108. The threaded rod 113 engages one or more nut members 114, 115 attached to the plate 106, and an end of the threaded rod preferably extends externally of the housing 21 to be equipped with a hand wheel or other appropriate device for rotating the threaded rod.

Turning once again to FIG. 6, it can be seen that an arm 120 is pivotally attached as at 121 to a location adjacent the rear of the tire conditioning apparatus. An actuator 122, which may also be provided by an appropriate hydraulic or pneumatic cylinder, is pivotally connected between the arm 120 and the tire conditioning apparatus to adjust the relative position of the arm. A drive wheel 123 is mounted on a shaft 124 extending through and into the outer end 125 of the arm 120, and the interior end of the shaft 124 is connected by a suitable drive member such as a belt and pulley arrangement to receive rotational force imparted by the motor 126 disposed adjacent the pivoted end of the arm 120. Since the drive wheel 23 rotates the tire 103 by frictional engagement therewith, the peripheral surface of the drive wheel may be suitably roughened to enhance frictional driving engagement.

A support arm 130 extends outwardly from the sidewall 25 at an elevation thereof which is approximately the same as the elevational location of the mandrel 100. Mounted on the support arm 30 is a truing motor assembly 131 including a rotating cutter 132, which may be of conventional tire truing cutter design. A hand wheel 133 is connected to a rotatable threaded rod (not shown) extending through the support arm 130, and it will be understood by those skilled in the art that the truing motor assembly 131 includes a nut member extending into the support arm to engage the threaded rod therein so that the position of the truing motor assembly and the cutter 132 can be adjusted by rotating the hand wheel 133. It will also be understood by those skilled in the art that the truing motor assembly 131 may additionally be equipped for transverse movement, relative to the support arm 130, so that the spacing between the cutter 132 and the tread of the tire 103 can be selectively adjusted.

Considering the operation of the tire truing apparatus as herein described, a tire 103 which has previously been conditioned in the apparatus 20 is now mounted on the mandrel 100 through the use of appropriate cones 102. The threaded rod 113 is then rotated to the extent, if any, necessary to adjust the position of the mandrel 100 to place the tread of the tire 103 in proximate relative with cutter 132, thereby providing a coarse positioning of the tread-cutter spacing. The actuator 122 is next energized by application of suitable fluid pressure, for example, moving the arm 125 downwardly to place the drive wheel 123 into engagement with the tread surface of the tire 103. The motor 126 is actuated to rotate the drive wheel 123 in the counterclockwise direction, as viewed in FIG. 6, thereby causing the tire 103 to rotate in the clockwise direction past the cutter 132. The truing motor assembly is next energized to rotate the cutter 132; the hand wheel 133 and/or the transverse motion adjustment of the truing motor assembly is operated in the conventional manner to cause the cutter 132 to traverse the tread width of the rotating tire 103, thus removing tread rubber as necessary to accomplish the truing operation.

It can be seen that the tread rubber removed by the truing process according to the tire truing apparatus of the present invention is directed substantially downwardly and away from the truing motor assembly, the support arm 130, the drive wheel 123, and the operator of the apparatus. This removed rubber can be accumulated either in a suitable container or by suction or other removal apparatus as appropriate. This disposition of the removed rubber results from the positioning of the truing motor assembly approximately on a plane with the mandrel 100, rather than at a position substantially below the mandrel at or approaching the bottom wall 23 of the conditioning apparatus.

Since the tire drive wheel 123 is positioned above the truing motor assembly and contacts the tire at a location thereon "upstream" from the downwardly-directed tread rubber removed by the truing operation, clogging and other interference resulting from accumulations of removed rubber is eliminated according to the present invention.

Apparatus as depicted in FIGS. 6 and 7 can additionally be employed to balance tires mounted on the mandrel 100, if the bearings 104 and 105 are selected for minimum rotational friction.

The specific hydraulic, pneumatic, or other operating conduits connected to the several actuators in the disclosed embodiment of the present invention have not been disclosed herein, since a particular configuration of conduits and associated control apparatus is not critical to the design or the operation of the present invention.

It will additionally be understood that the foregoing relates only to preferred embodiments of the present invention, and that numerous alterations and modifications may be made therein without departing from the spirit and the scope of the present invention.

What is claimed is:

1. Tire conditioning apparatus comprising:
housing means defining an interior region dimensioned to receive a tire to be conditioned;
rotatable support roller means mounted in said housing means to rotatably support a tire received in said interior region;
motive means operably disposed in said housing means to impart rotation to a tire disposed on said support roller means;
pressure roller means disposed in said housing means to selectively apply force tending to resiliently deform a tire disposed on said support roller means; and
heater means positioned in said housing means to apply heat directly to each of the sidewalls of a tire disposed on said support roller means.

2. Apparatus as in claim 1, wherein:
said support roller means is a first roller means; and said motive means comprises:
second roller means mounted to rotatably support a tire received in said interior region; and
a source of rotational motion operatively engaging said second roller means to selectively rotationally drive said second roller means.

3. Apparatus as in claim 2, wherein:
said first and second roller means are disposed in spaced-apart parallel relation; and
said heater means comprises a pair of heat sources positioned at a location intermediate said first and second roller means, said heat sources confronting each other and being spaced apart from each other to accommodate therebetween and to apply heat directly to each of the sidewalls of a tire supported on said first and second roller means.

4. Apparatus as in claim 2, further comprising:
at least two sidewall rollers disposed in said housing means in opposed spaced relation on opposite sides of the tire receiving region for selective movement into contact with opposed sidewall locations on opposite sides of a tire supported on said first and second roller means.

5. Apparatus as in claim 4, wherein:
each of said sidewall rollers is supported on a corresponding support member in certain angular relation proximately conforming to the adjacent sidewall angular relation of a tire supported on said first and second roller means; and
each of said support members being selectively movable to a first position placing said sidewall rollers into said contact with opposed tire sidewall locations and to a second position withdrawing said sidewall rollers from contact with the tire.

6. Apparatus as in claim 5, wherein:
said pressure roller means is mounted in said housing spaced apart from said first and second roller means and includes a cylindrical roller portion for selective movement into forceable contact with a location on the tread surface of a tire supported on said first and second roller means;
each of said support members being pivotally mounted on opposite sides of said region for selective movement between said first and second positions;
linkage means operatively interconnecting each of said support members to define scissors movement of said support members and said sidewall rollers supported thereon between said first and second positions; and
an actuating mechanism operatively connected to selectively impart force to said interconnected support members directing said sidewall rollers to assume said first position.

7. Apparatus as in claim 3, wherein:
each of said first and second roller means includes a roller portion upon which a tire received in said interior region is supported for rotation; and further comprising;
at least two sidewall rollers disposed in spaced apart relation on opposite sides of the tire receiving region for selective movement into contact with opposed sidewall locations on opposite sides of a tire supported on said roller portions of said first and second roller means;
said sidewall rollers being disposed in said housing means in proximately symmetrical alignment with respect to said roller portions to maintain a tire in position on said roller portions.

* * * * *